(12) United States Patent
Yoshitomi (10) Patent No.: US 10,631,649 B2
(45) Date of Patent: Apr. 28, 2020

(54) SEAT PAD

(71) Applicant: BRIDGESTONE CORPORATION, Tokyo (JP)

(72) Inventor: Kosuke Yoshitomi, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/779,974

(22) PCT Filed: Dec. 12, 2016

(86) PCT No.: PCT/JP2016/086889
§ 371 (c)(1),
(2) Date: May 30, 2018

(87) PCT Pub. No.: WO2017/104605
PCT Pub. Date: Jun. 22, 2017

(65) Prior Publication Data
US 2019/0014906 A1   Jan. 17, 2019

(30) Foreign Application Priority Data
Dec. 16, 2015 (JP) .................................. 2015-245704

(51) Int. Cl.
*A47C 7/18* (2006.01)
*B60N 2/90* (2018.01)
(Continued)

(52) U.S. Cl.
CPC ................ *A47C 7/18* (2013.01); *A47C 27/14* (2013.01); *B60N 2/90* (2018.02); *B60N 2/986* (2018.02);
(Continued)

(58) Field of Classification Search
CPC .. A47C 7/18; A47C 27/14; B60N 2/90; B60N 2/986; B60N 2/62; C08G 18/1833; C08G 18/632
(Continued)

(56) References Cited

U.S. PATENT DOCUMENTS 3,612,607 A * 10/1971 Lohr ........................ A47C 7/18
                                                          297/451.11
3,675,970 A *  7/1972 Bereday ................ A47C 7/185
                                                          297/452.24
(Continued)

FOREIGN PATENT DOCUMENTS

CN       101516954 A       8/2009
CN       104558508 A       4/2015
(Continued)

OTHER PUBLICATIONS

International Search Report for PCT/JP2016/086889 dated Mar. 14, 2017 [PCT/ISA/210].
(Continued)

*Primary Examiner* — Milton Nelson, Jr.
(74) *Attorney, Agent, or Firm* — Sughrue Mion, PLLC (57) ABSTRACT

The present invention is a seat pad (10) that includes a main component (1) having a seating surface and side components (2) disposed on both sides of the main component. The main component includes a main first pressure receiving portion (1a) and a main second pressure receiving portion (1b). The main first pressure receiving portion has a higher foam density than the side components disposed on both sides. The main component and each of the side components are a flexible polyurethane foam obtained by foam molding a foaming stock solution containing a polyol, a polyisocyanate, a blowing agent, and a catalyst. The main first pressure receiving portion contains diphenylmethane diisocyanate (Continued)

(MDI). Each of the side components contain tolylene diisocyanate (TDI).

8 Claims, 1 Drawing Sheet

(51) Int. Cl.
    *C08G 18/63*      (2006.01)
    *C08G 18/18*      (2006.01)
    *A47C 27/14*      (2006.01)

(52) U.S. Cl.
    CPC ....... *C08G 18/1833* (2013.01); *C08G 18/632* (2013.01)

(58) Field of Classification Search
    USPC ................. 297/452.27, DIG. 1, DIG. 2
    See application file for complete search history.

(56) References Cited

U.S. PATENT DOCUMENTS

| | | | |
|---|---|---|---|
| 5,544,942 A * | 8/1996 | Vu Khac ................. | A47C 7/18 297/452.27 |
| 2008/0012407 A1 | 1/2008 | Ebe | |
| 2010/0102616 A1 | 4/2010 | Yamasaki et al. | |
| 2016/0113405 A1 * | 4/2016 | Yoshitomi .............. | A47C 27/14 297/452.48 |

FOREIGN PATENT DOCUMENTS

| | | |
|---|---|---|
| EP | 1 832 204 A1 | 9/2007 |
| JP | 2001-70083 A | 3/2001 |
| JP | 2002-300936 A | 10/2002 |
| JP | 2005-124744 A | 5/2005 |
| JP | 2006-204887 A | 8/2006 |
| JP | 2008-127514 A | 6/2008 |
| JP | 2008-188285 A | 8/2008 |
| JP | 2013-124259 A | 6/2013 |
| JP | 2013-124336 A | 6/2013 |
| JP | 5552442 B2 | 7/2014 |
| WO | 2010140304 A1 | 12/2010 |

OTHER PUBLICATIONS

Communication dated Oct. 11, 2018, from European Patent Office in counterpart application No. 16875582.5.
Zhong Liuhua, "Auto Seat Design and Manufacturing", National Defense Industry Press, Apr. 2015, pp. 143-145 (total 5 pages).
Search Report dated Feb. 28, 2020 from the State Intellectual Property Office of the P.R.C. in Application No. 201680073081.5.

* cited by examiner

// SEAT PAD

TECHNICAL FIELD

The present invention relates to a seat pad of a vehicle.

This application is a National Stage of International Application No. PCT/JP2016/086889, filed on Dec. 12, 2016, which claims priority from Japanese Patent Application No. 2015-245704, filed Dec. 16, 2015, the content of which is incorporated herein by reference.

Priority is claimed on Japanese Patent Application No. 2015-245704, filed Dec. 16, 2015, the content of which is incorporated herein by reference.

BACKGROUND ART

For seat pads in automobiles, aircrafts, trains, and the like, lightweightness is required for not only ride comfort but also improvement in fuel efficiency. Polyurethane foams that have an appropriate resilience, are lightweight, and have an excellent vibration absorption characteristic that are molded in a seat pad are used. As such polyurethane foams, the applicant has proposed Patent Document 1. The polyurethane foam is a polyurethane foam obtained by foam molding a polyurethane foaming stock solution containing a polyol and isocyanate. A polyether polyol whose molecular weight, degree of unsaturation, and molecular weight/number of functional groups are regulated to be within specific ranges is used as a main component, and an organically-treated inorganic filler is additionally added.

CITATION LIST

Patent Document

[Patent Document 1]
Japanese Unexamined Patent Application Publication No. 2008-127514

SUMMARY OF INVENTION

Technical Problem

An object of the present invention is to provide a seat pad having both a reduced weight and ride comfort.

Solution to Problem

A first aspect of the present invention is a seat pad including:
a main component having a seating surface; and
side components that are disposed on both sides of the main component,
wherein the main component includes a main first pressure receiving portion and a main second pressure receiving portion that are provided side by side,
wherein the side components are provided in a direction in which the main first pressure receiving portion and the main second pressure receiving portion are arranged and on both sides of the main first pressure receiving portion and the main second pressure receiving portion,
wherein the main first pressure receiving portion and the main second pressure receiving portion are a flexible polyurethane foam obtained by foam molding a foaming stock solution containing a polyol, a polyisocyanate, a blowing agent, and a catalyst,
wherein the foaming stock solution that forms the main first pressure receiving portion contains a polyether polyol A1 having a weight average molecular weight (Mw) of 3000 to 8000 and 3 to 4 functional groups, and diphenylmethane diisocyanate (MDI),
wherein each of the side components is a flexible polyurethane foam obtained by foam molding a foaming stock solution containing a polyol, a polyisocyanate, a blowing agent, and a catalyst,
wherein the foaming stock solution that forms each of the side components contains a polyether polyol A2 having a weight average molecular weight (Mw) of 3000 to 8000 and 3 to 4 functional groups, and tolylene diisocyanate (TDI), and
wherein a foam density of the main first pressure receiving portion is higher than a foam density of each of the side components.

A second aspect of the present invention is a seat part according to the first aspect,
wherein the foaming stock solution that forms the main second pressure receiving portion contains a polyether polyol A3 having a weight average molecular weight (Mw) of 3000 to 8000 and 3 to 4 functional groups, and diphenylmethane diisocyanate (MDI).

A third aspect of the present invention is a seat pad according to the first aspect or the second aspect,
wherein a foam hardness of the main second pressure receiving portion is lower than a foam hardness of the main first pressure receiving portion.

A fourth aspect of the present invention is the seat pad according to any one of the first aspect to the third aspect,
wherein the main first pressure receiving portion is an under-buttock portion during seating and the main second pressure receiving portion is an under-thigh portion during seating.

Effects of Invention

The seat pad of the present invention has ride comfort (seating stability) equal to or greater than that in the related art and is reduced in weight.

DESCRIPTION OF EMBODIMENTS

Exemplary embodiments of the present invention will be described below with reference to the drawings. However, the present invention is not limited to the following embodiments.

<Seat Pad>

Figure 1:
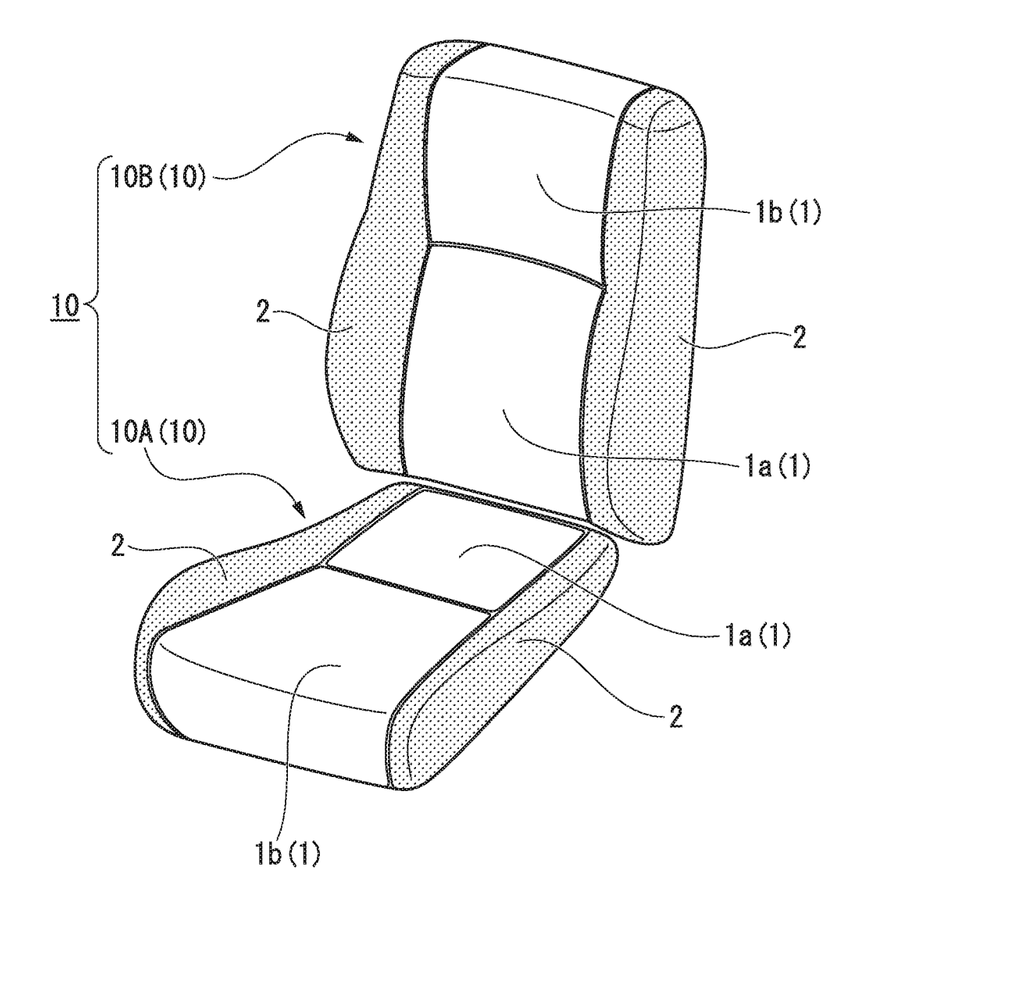
FIG. 1 is a schematic diagram showing an exterior of a seat pad produced in an example.

A seat pad 10 shown in FIG. 1 is a seat pad that includes a main component 1 having a seating surface and side components 2 disposed on both sides of the main component 1.

The main component 1 includes a main first pressure receiving portion 1a and a main second pressure receiving portion 1b with a seating surface provided thereacross The side components 2 are provided in a direction in which the main first pressure receiving portion 1a and the main second pressure receiving portion 1b are arranged and on both sides of the main first pressure receiving portion 1a and the main second pressure receiving portion 1b.

Here, the seating surface of the seat pad 10 is a main surface that supports the lower body or the upper body of a seated human.

The seat pad 10 shown FIG. 1 includes a cushion pad 10A that mainly supports the lower body of the seated human and a back pad 10B that supports her or his upper body.

The cushion pad 10A includes the central main component 1 having a seating surface on the side of the lower body and a pair of side components 2 disposed on both sides of the main component 1. The main component 1 includes the main first pressure receiving portion 1a and the main second pressure receiving portion 1b. In the cushion pad 10A, the main first pressure receiving portion 1a is an under-buttock portion that mainly supports the buttocks of the seated human, and the main second pressure receiving portion 1b is an under-thigh portion that mainly supports the thighs of the seated human.

The back pad 10B includes the central main component 1 having a seating surface on the side of the upper body and a pair of side components 2 disposed on both sides of the main component 1. The main component 1 includes the main first pressure receiving portion 1a and the main second pressure receiving portion 1b. In the back pad 10B, the main first pressure receiving portion 1a is an under-waist portion that mainly supports the waist of the seated human and the main second pressure receiving portion 1b is an under-shoulder portion that mainly supports the shoulders of the seated human.

The seat pad 10 according to the present invention may include only the cushion pad 10A, only the back pad 10B, or both thereof.

In this specification, unless otherwise specified, the cushion pad 10A and the back pad 10B are not distinguished from each other and they are defined as the seat pad 10.

In addition, a main component of the cushion pad 10A and a main component of the back pad 10B are defined collectively as the main component 1, and a side component of the cushion pad 10A and a side component of the back pad 10B are defined collectively as the side component 2.

In addition, the under-buttock portion and the under-waist portion in the main component 1 are defined collectively as the main first pressure receiving portion 1a. The under-thigh portion and the under-shoulder portion in the main component 1 are defined collectively as the main second pressure receiving portion 1b. In a general sitting mode, in both of the cushion pad 10A and the back pad 10B, a load on the main first pressure receiving portion 1a is larger than a load on the main second pressure receiving portion 1b.

In the seat pad 10, a foam density of the main first pressure receiving portion 1a is higher than a foam density of each of the side components 2 disposed on both sides thereof. According to such a relationship, the seating stability is excellent, and it is possible to easily reduce the weight of the seat pad 10.

In the seat pad 10, preferably, a foam density of the main second pressure receiving portion 1b is equal to or higher than a foam density of each of the side components 2 disposed on both sides thereof. According to such a relationship, the seating stability is excellent and it is possible to easily reduce the weight of the seat pad 10.

Here, foam densities of the portions are compared according to values measured in the following method.

<Main Component>

The main first pressure receiving portion 1a and the main second pressure receiving portion 1b in the main component 1 are formed of a flexible polyurethane foam obtained by foam molding a foaming stock solution containing a polyol, a polyisocyanate, a blowing agent, and a catalyst.

[Main First Pressure Receiving Portion]

The foaming stock solution that forms the main first pressure receiving portion 1a satisfies the following (i) to (ii).

(i) The foaming stock solution contains a polyether polyol A1 having a weight average molecular weight (Mw) of 3000 to 8000 and 3 to 4 functional groups.

(ii) The polyisocyanate contains diphenylmethane diisocyanate (MDI).

<Polyol>

(Polyether Polyol A1)

The polyether polyol A1 contained in the foaming stock solution is a polyether polyol having a weight average molecular weight (Mw) of 3000 to 8000 and 3 to 4 functional groups (hydroxy groups). As the polyether polyol A1, a polyether polyol obtained by ring-opening polymerization of an alkylene oxide is preferable because it has favorable reactivity.

Examples of the alkylene oxide include propylene oxide (PO) and ethylene oxide (EO). The alkylene oxide used as a material of the polyether polyol A1 may be of one type or two or more types.

The mixing ratio (mass ratio) between PO and EO in the polyether polyol A1 contained in the foaming stock solution is not particularly limited. For example, as EO/PO (mass ratio), 0/100 to 25/75 is preferable, and 0/100 to 20/80 is more preferable. When EO/PO (mass ratio) is within the above range, it is possible to easily form a flexible polyurethane foam having excellent physical properties.

The number of hydroxy groups (functional groups) included in one molecule of the polyether polyol A1 contained in the foaming stock solution is 3 to 4. Within such a range, the viscosity of the foaming stock solution becomes appropriate and it is possible to obtain a flexible polyurethane foam having excellent physical properties.

The weight average molecular weight (Mw) of the polyether polyol A1 contained in the foaming stock solution is preferably 4000 to 8000, more preferably 4500 to 7000, and most preferably 5000 to 6500. When the weight average molecular weight of the polyether polyol A1 is 8000 or less, the viscosity of the foaming stock solution becomes appropriate and the stirring efficiency becomes favorable. On the other hand, when the weight average molecular weight of the polyether polyol A1 is 3000 or more, it is possible to obtain a flexible polyurethane foam having an appropriate hardness.

Here, the weight average molecular weight (Mw) is a value calculated as a polystyrene equivalent value by gel permeation chromatography (GPC method).

The degree of unsaturation of the polyether polyol A1 contained in the foaming stock solution is preferably 0.03 milliequivalents/gram or less. When the degree of unsaturation is 0.03 milliequivalents/gram or less, it is possible to obtain a flexible polyurethane foam having favorable physical properties such as durability. Here, the "degree of unsaturation" refers to the total degree of unsaturation (milliequivalents/gram) that is measured by a method in which mercury(II) acetate acts on unsaturated bonds of a sample, and released acetic acid is titrated with potassium hydroxide according to Japanese Industrial Standards JIS K 1557-1970.

The polyether polyol A1 contained in the foaming stock solution may be of one type or two or more types.

In order to easily impart desired physical properties to the flexible polyurethane foam obtained by foam molding the foaming stock solution, the total amount of one type or two or more types of polyether polyol corresponding to the polyether polyol A1 with respect to the total mass of the polyol contained in the foaming stock solution is preferably 70 mass % or more, more preferably 80 to 98 mass %, and most preferably 85 to 95 mass %.

(Polymer Polyol A')

As an optional polyol that can be contained in the foaming stock solution, a polymer polyol A' that is a component different from the polyether polyol A1 may also be used. Here, "polymer polyol" generally refers to a polymer composition or a mixture obtained by polymerizing an ethylenically unsaturated compound in a polyether polyol. As such a polymer polyol A', a polymer polyol that is widely used for a polyurethane foam molded product can be used. For example, a polymer polyol obtained by graft copolymerization of a polymer component such as polyacrylonitrile or an acrylonitrile-styrene copolymer (AN/ST copolymer) in a polyether polyol which includes a polyalkylene oxide and has a weight average molecular weight (Mw) of 3000 to 8000, and more preferably, 4000 to 7000, may be used. As the alkylene oxide used as a material of the polyalkylene oxide, an alkylene oxide including propylene oxide (PO) as a functional group (polymerizable group) is preferable, and an alkylene oxide including only propylene oxide or an alkylene oxide including both propylene oxide and ethylene oxide (EO) are more preferable. In addition, the amount of the polymer component with respect to the total mass of the polymer polyol A' is preferably 10 to 50 mass %.

Here, the polymer polyol A' is a polyol as an optional component that does not correspond to the polyether polyol A1.

When the polyether polyol A1 and the polymer polyol A' are used together as the polyol contained in the foaming stock solution, [polyether polyol A1]/[polymer polyol A'] (mass ratio) is preferably 70/30 to 99/1, more preferably 80/20 to 99/1, and most preferably 85/15 to 99/1. Within the above range, it is possible to easily obtain a flexible polyurethane foam having desired physical properties.

<Polyisocyanate>

The polyisocyanate contained in the foaming stock solution of the main first pressure receiving portion 1a includes diphenylmethane diisocyanate (MDI). An isocyanate index thereof is preferably 70 to 120. Within such a range, it is possible to impart an appropriate hardness to the flexible polyurethane foam and it is possible to improve the seating stability.

In this specification, the "isocyanate index" refers to a percentage of the amount actually added with respect to a stoichiometrically calculated required amount of polyisocyanate that reacts with all active hydrogen included in the polyol and the like in the foaming stock solution. For example, when the isocyanate index is 90, this means that 90% of polyisocyanate by mass percentage is added with respect to a stoichiometrically required amount for reacting with all active hydrogen included in the polyol and the like in the foaming stock solution.

The isocyanate index derived from MDI contained in the foaming stock solution is preferably 70 to 120 and more preferably 80 to 100. When the isocyanate index is 70 or more, it is possible to easily stir the foaming stock solution. When the isocyanate index is 120 or less, it is possible to prevent collapse of the foam and it is possible to easily obtain a more favorable foam.

Diphenylmethane diisocyanate (MDI) is a polyisocyanate component that is generally used in the field of polyurethane foams. As a specific type of MDI, 4,4-diphenylmethane diisocyanate (4,4-MDI), 2,4-diphenylmethane diisocyanate (2,4-MDI), and 2,2-diphenylmethane diisocyanate (2,2-MDI) which are generally referred to as monomeric MDI, polymeric MDI, crude MDI, and the like are exemplary examples.

In the foaming stock solution, one type of MDI may be contained alone or two or more types of MDI may be contained.

As an optional component, in addition to MDI in the above (ii), a small amount of a known polyisocyanate other than MDI may be added. Tolylene diisocyanate (TDI), triphenyl diisocyanate, xylene diisocyanate, polymethylene polyphenylene polyisocyanate, hexamethylene diisocyanate, and isophorone diisocyanate are exemplary examples.

In order to easily impart desired physical properties to the flexible polyurethane foam obtained by foam molding the foaming stock solution, the total amount of one type or two or more types of diphenylmethane diisocyanate with respect to the total mass of the polyisocyanate contained in the foaming stock solution is preferably 70 mass % or more, more preferably 80 to 100 mass %, still more preferably 90 to 100 mass %, and most preferably 95 to 100 mass %.

<Blowing Agent>

As the blowing agent contained in the foaming stock solution, water is preferably used. Since water reacts with polyisocyanate and generates carbon dioxide gas, it functions as a blowing agent.

The amount of water in the foaming stock solution is preferably 1 to 7 parts by mass and more preferably 2 to 5 parts by mass with respect to 100 parts by mass of polyol. Within the above range, it is possible to easily obtain a flexible polyurethane foam having desired physical properties. In addition, it is possible to prevent the thermal compression residual strain characteristic of the obtained flexible polyurethane foam from deteriorating.

<Catalyst>

As the catalyst contained in the foaming stock solution, a known catalyst used in the field of polyurethane foams may be used. Examples of the known catalyst include an amine-based catalyst and a tin catalyst.

In general, known catalysts are roughly classified into gelling catalysts and blowing catalysts.

Gelling catalysts accelerate the reaction between a polyol and a polyisocyanate and accelerate formation of urethane bonds. A catalyst with a ratio of a blowing catalyst constant to a gelling catalyst constant (blowing catalyst constant/gelling catalyst constant) of 1 or less is called a gelling catalyst.

A blowing catalyst accelerates foaming rather than gelling. A catalyst with a ratio of a blowing catalyst constant to a gelling catalyst constant of greater than 1 is called a blowing catalyst.

Here, the gelling catalyst constant is a constant used for determining a rate of a gelling reaction between polyols and polyisocyanates, and as a value thereof increases, a cross-linking density of a foamed product increases. Specifically, a reaction constant of a gelation reaction between tolylene diisocyanate and diethylene glycol is used. On the other hand, the blowing catalyst constant is a constant used for determining a rate of a foaming reaction between polyisocyanates and water, and as a value thereof increases, communicability of cells of a foamed product is improved. Specifically, a reaction constant of a foaming reaction between tolylene diisocyanate and water is used.

The gelling catalyst constant and the blowing catalyst constant are determined by a known method.

Examples of the gelling catalyst include tertiary amines such as triethylenediamine (TEDA), a mixture of triethylenediamine and polypropylene glycol, N,N,N',N'-tetramethylethylenediamine, N,N,N',N'-tetramethylpropylenediamine, N,N,N',N",N"-pentamethyl-(3-anminopropyl) ethylenediamine, N,N,N',N",N"-pentamethyldipropylenetrianine, N,N,N',N'-tetramethylguanidine, and 135-tris(N,N-dimethylaminopropyl)hexahydro-S-triazine; imidazoles such as 1-methylimidazole, 1,2-dimethylimidazole, and 1-isobutyl-2-methylimidazole; N,N,N',N'-tetramethylhexamethylenediamine, N-methyl-N'-(2-dimethylaminoethyl)piperazine, N,N'-dimethylpiperazine. N-methylpiperazine, N-methylmorpholine, and N-ethylmorpholine; and 1,8-diazabicyclo[5.4.0]undecene-7,1,1'-(3-(dimethylamino)propyl)imino)bis(2-propanol). As the gelling catalyst, a tertiary amine-based catalyst is preferable.

Examples of the blowing catalyst include bis(2-dimethylaminoethyl)ether, N,N,N',N",N"-pentamethyldiethylenetriamine, and N,N,N',N',N",N'''-hexamethyltriethylenetetramine. As the blowing catalyst, a tertiary amine-based catalyst is preferable.

In addition to the above amine-based catalyst, as the tin catalyst, known organotin catalysts, for example, stannous octoate, stannous laurate, dibutyltin dilaurate, dibutyltin dimaleate, dibutyltin diacetate, dioctyltin diacetate, and tin octylate, may be used.

In the foaming stock solution, as the catalyst, between the gelling catalyst and the blowing catalyst, at least the gelling catalyst is preferably contained.

The mass ratio of the gelling catalyst/blowing catalyst contained in the foaming stock solution is preferably 100/0 to 100/100.

The amount of the amine-based catalyst in the foaming stock solution is preferably 0.1 to 5.0 parts by mass, more preferably 0.3 to 3.0 parts by mass, and most preferably 0.5 to 2.0 parts by mass with respect to 100 parts by mass of the polyol.

When the amount is a lower limit value of the above range or more, it is possible to prevent collapse of the foam. When the amount is an upper limit value of the above range or less, it is possible to prevent shrinkage due to closed cells.

The amount of the tin catalyst in the foaming stock solution is preferably 0.001 to 1 parts by mass with respect to 100 parts by mass of the polyol.

<Foam Stabilizer>

A foam stabilizer may be contained in the foaming stock solution. As the foam stabilizer, a known foam stabilizer that is used in the field of polyurethane foams can be used. For example, a silicone-based foam stabilizer, an anionic foam stabilizer, and a cationic foam stabilizer may be used. Such foam stabilizers may include a foam stabilizer having a hydroxyl group at a molecular chain terminal.

The amount of the foam stabilizer in the foaming stock solution is preferably 0.1 to 5 parts by mass, more preferably 0.5 to 3 parts by mass, and most preferably 0.7 to 2 parts by mass with respect to 100 parts by mass of the polyol. In general, the effect as the foam stabilizer can be sufficiently obtained at a content proportion of 5 parts by mass or less. In addition, when a content proportion is 0.1 parts by mass or more, a stirring property of the polyol and the polyisocyanate is improved, and it is possible to easily obtain a flexible polyurethane foam having desired physical properties.

<Crosslinking Agent>

In the foaming stock solution, one or more types of known crosslinking agents used in the field of polyurethane foams may be contained. Examples of the crosslinking agent include diethanolamine and a polyol with a hydroxyl value of 200 or more. Generally, the molecular weight of the crosslinking agent is preferably 1000 or less. The amount of the crosslinking agent in the foaming stock solution can be, for example, 0.1 to 20 parts by mass, with respect to 100 parts by mass of the polyether polyol A contained in the foaming stock solution.

<Other Optional Components>

Various additives can be added to the foaming stock solution as necessary. For example, a coloring agent such as a pigment, a chain extender, a filler such as calcium carbonate, a flame retardant, an antioxidant, a UV absorber, a light stabilizer, a conductive substance such as carbon black, and an antimicrobial agent can be added. The amounts of various additives added are appropriately adjusted according to applications and purposes.

<Method of Preparing Foaming Stock Solution>

A method of preparing the foaming stock solution is not particularly limited. For example, a preparation method in which a mixture (hereinafter referred to as a "polyol mixture" in some cases) including the remaining materials except for polyisocyanate is prepared, and is then mixed with polyisocyanate to obtain a foaming stock solution may be used.

When the polyol mixture is prepared, a known method may be used for mixing. Then, in a process of foam molding the flexible polyurethane foam, preferably, the polyol mixture and polyisocyanate are mixed to prepare a foaming stock solution.

The viscosity of the prepared polyol mixture at a liquid temperature of 25° C. is preferably 4,000 mPa·s or less and more preferably 3,000 mPa·s or less. Within such an appropriate viscosity range, stirring efficiency of the foaming stock solution becomes favorable, a sufficient amount of foam is uniformly obtained from the entire foaming stock solution, and it is possible to easily obtain a flexible polyurethane foam (foam molded product) having desired physical properties.

A method of foam molding the flexible polyurethane foam using the foaming stock solution is not particularly limited. For example, a known method in which a foaming stock solution is injected into a cavity formed in a mold and foam molding is performed can be used.

In the above known method, a liquid temperature of the foaming stock solution injected is preferably 10 to 50° C. The temperature of the mold is preferably 40 to 80° C. When the liquid temperature of the foaming stock solution and the temperature of the mold are within the above appropriate range, it is possible to easily obtain an appropriate foam. Together with the foam, a polyol component and a polyisocyanate component are polymerized to form a polyurethane, and the polyurethane is cured as the polymerization proceeds. Then, when the mold is released, a desired flexible polyurethane foam is obtained. Here, a known reticulation treatment may be additionally performed on the obtained flexible polyurethane foam.

The "flexibility" of the flexible polyurethane foam refers to hardness (stiffness) to such an extent that the flexible polyurethane foam is deformed and recessed when the flexible polyurethane foam is pressed by hand or a user sits thereon.

When the "foam density" of the main first pressure receiving portion $1a$ is measured by the following method, the value (unit: kg/m$^3$) is preferably 56 to 90, more preferably 60 to 80, and most preferably 65 to 75.

When the foam density is within the above range, the seating stability of the main first pressure receiving portion 1a becomes favorable.

The level of the foam density can be adjusted by, for example, an amount of blowing agent contained in the foaming stock solution. When an amount of blowing agent increases, the foam density tends to decrease.

When the "foam hardness" of the main first pressure receiving portion 1a is measured by the following method, the value (unit: $kgf/314\ cm^2$) is preferably 20 to 30, more preferably 21 to 28, and most preferably 22 to 25.

When the foam hardness is within the above range, the seating stability of the main first pressure receiving portion 1a becomes favorable.

The level of the foam hardness can be adjusted by, for example, an isocyanate index of the foaming stock solution. When the isocyanate index increases, the foam hardness tends to increase.

The foam hardness of the main first pressure receiving portion 1a is preferably higher than the foam hardness of the main second pressure receiving portion 1b. According to such a relationship, the operability when an automobile runs is further improved.

For example, when the isocyanate index of the foaming stock solution that forms the main first pressure receiving portion 1a is set to be higher than the isocyanate index of the foaming stock solution that forms the main second pressure receiving portion 1b, the above relationship can be established.

[Main Second Pressure Receiving Portion]

Similarly to the main first pressure receiving portion 1a, the main second pressure receiving portion 1b is formed by a flexible polyurethane foam obtained by foam molding a foaming stock solution containing a polyol, a polyisocyanate, a blowing agent, and a catalyst.

Preferably, the foaming stock solution that forms the main second pressure receiving portion 1b satisfies the following (iv) to (v).

(iv) The foaming stock solution contains a polyether polyol A3 having a weight average molecular weight (Mw) of 3000 to 8000 and 3 to 4 functional groups.

(v) The foaming stock solution contains diphenylmethane diisocyanate (MDI) at an isocyanate index of 70 to 120.

<Polyol>

(Polyether Polyol A3)

As the polyether polyol A3 contained in the foaming stock solution, the same polyether polyol A1 that forms the main first pressure receiving portion 1a are exemplary examples.

The polyether polyol A3 of the main second pressure receiving portion 1b and the polyether polyol A1 of the main first pressure receiving portion 1a may be of the same type or different types.

The polyether polyol A3 contained in the foaming stock solution may be of one type or two or more types.

In order to easily impart desired physical properties to the flexible polyurethane foam obtained by foam molding the foaming stock solution, a total amount of one type or two or more types of polyether polyol corresponding to the polyether polyol A3 with respect to the total mass of the polyol contained in the foaming stock solution is preferably 55 mass % or more, more preferably 70 to 98 mass %, and most preferably 85 to 95 mass %.

(Polymer Polyol A')

As an optional polyol that can be contained in the foaming stock solution, the above polymer polyol A' which is a component different from the polyether polyol A3 may also be used.

When the polyether polyol A3 and the polymer polyol A' are used together, [polyether polyol A3]/[polymer polyol A'] (mass ratio) is preferably 58/42 to 99/1, more preferably 80/20 to 99/1, and most preferably 85/15 to 99/1. Within the above range, it is possible to easily obtain a flexible polyurethane foam having desired physical properties.

<Polyisocyanate>

The polyisocyanate contained in the foaming stock solution that forms the main second pressure receiving portion 1b may be diphenylmethane diisocyanate (MDI) or tolylene diisocyanate (TDI).

The polyisocyanate is preferably contained at an isocyanate index of 70 to 120 or more. When the isocyanate index is 70 or more, it is possible to impart an appropriate hardness to the flexible polyurethane foam. When the isocyanate index is adjusted, it is possible to adjust the foam hardness. In general, when the isocyanate index is lowered, the foam hardness is lowered and softness can be obtained.

The isocyanate index derived from MDI contained in the foaming stock solution is preferably 70 to 120, and more preferably 80 to 100. When the isocyanate index is 70 or more, it is possible to easily stir the foaming stock solution. When the isocyanate index is 120 or less, it is possible to prevent collapse of the foam and it is possible to easily obtain a more favorable foam.

As MDI that forms the main second pressure receiving portion 1b, the same MDI that forms the main first pressure receiving portion 1a is an exemplary example.

Tolylene diisocyanate (TDI) is a polyisocyanate component that is generally used in the field of polyurethane foams. As a specific type of TDI, 2,4-tolylene diisocyanate (2,4-TDI), and 2,6-tolylene diisocyanate (2,6-TDI) are exemplary examples. As a commercially available product, a mixture of 2,4-TDI/2,6-TDI=80/20 (mass ratio) is produced and commercially available. When TDI is contained in the foaming stock solution, the TDI may be a mixture of 2,4-TDI and 2,6-TDI, 2,4-TDI alone, or 2,6-TDI alone. That is, in the foaming stock solution, one type of TDI may be contained alone or two or more types of TDI may be contained.

The isocyanate index derived from TDI contained in the foaming stock solution is preferably 70 to 120 and more preferably 80 to 110. When the isocyanate index is 70 or more, it is possible to prevent poor stirring of the foaming stock solution. When the isocyanate index is 120 or less, it is possible to prevent collapse of the foam.

When the MDI is contained in the foaming stock solution together with TDI, a total isocyanate index derived from TDI and MDI contained in the foaming stock solution is preferably 70 to 120. When the isocyanate index is 70 or more, it is possible to prevent poor stirring of the foaming stock solution. When the isocyanate index is 120 or less, it is possible to prevent collapse of the foam.

In order to improve the operability of the seat pad 10 when the automobile runs, the polyisocyanate contained in the main second pressure receiving portion 1b preferably contains MDI as a main component.

In order to reduce the weight of the seat pad 10, the polyisocyanate contained in the main second pressure receiving portion 1b preferably contains TDI as a main component.

Similarly to the foaming stock solution that forms the main first pressure receiving portion 1a, the foaming stock solution that forms the main second pressure receiving portion 1b preferably contains a blowing agent, a catalyst, and a foam stabilizer. In addition, the crosslinking agent and other optional components may be contained.

A method of preparing the foaming stock solution that forms the main second pressure receiving portion 1b and a foam molding method can be performed in the same manner as in the foaming stock solution that forms the main first pressure receiving portion 1a.

When the "foam density" of the main second pressure receiving portion 1b is measured by the following method, the value (unit: kg/m) is preferably 50 to 80, more preferably 55 to 75, and most preferably 55 to 70.

When the foam density is within the above range, the seating stability of the main second pressure receiving portion 1b becomes favorable.

When the "foam hardness" of the main second pressure receiving portion 1b is measured by the following method, the value (unit: kgf/314 cm$^2$) is preferably 15 to 28, more preferably 18 to 25, and most preferably 19 to 23.

When the foam hardness is within the above range, the seating stability of the main second pressure receiving portion 1b becomes favorable.

Preferably, the main second pressure receiving portion 1b is soft with a lower foam hardness than the main first pressure receiving portion 1a. According to such a relationship, the operability when an automobile runs is further improved.

<Side Component>

The side component 2 is formed of a flexible polyurethane foam obtained by foam molding the foaming stock solution containing a polyol, a polyisocyanate, a blowing agent, and a catalyst.

The foaming stock solution that forms the side component 2 satisfies the following (vii) to (viii).

(vii) The foaming stock solution contains a polyether polyol A2 having a weight average molecular weight (Mw) of 3000 to 8000 and 3 to 4 functional groups.

(viii) The foaming stock solution contains tolylene diisocyanate (TDI).

<Polyol>

(Polyether Polyol A2)

As the polyether polyol A2 contained in the foaming stock solution, the same polyether polyol A1 that forms the main first pressure receiving portion 1a is an exemplary example.

The polyether polyol A2 of the side component 2 and the polyether polyol A1 of the main first pressure receiving portion 1a may be of the same type or different types.

The polyether polyol A2 contained in the foaming stock solution may be of one type or two or more types.

In order to easily impart desired physical properties to the flexible polyurethane foam obtained by foam molding the foaming stock solution, a total amount of one type or two or more types of polyether polyol corresponding to the polyether polyol A2 with respect to the total mass of the polyol contained in the foaming stock solution is preferably 30 mass % or more, more preferably 40 to 80 mass %, and most preferably 50 to 70 mass %.

(Polymer Polyol A')

As an optional polyol that can be contained in the foaming stock solution, the polymer polyol A' that is a component different from the polyether polyol A2 is preferably also used.

When the polyether polyol A2 and the polymer polyol A' are used together, [polyether polyol A2]/[polymer polyol A'] (mass ratio) is preferably 80/20 to 90/10 and more preferably 50/50 to 80/20. Within the above range, it is possible to easily obtain a flexible polyurethane foam having desired physical properties.

<Polyisocyanate>

The polyisocyanate contained in the foaming stock solution of the side component 2 contains tolylene diisocyanate (TDI).

The isocyanate index derived from TDI contained in the foaming stock solution is preferably 70 to 120 and more preferably 80 to 110. When the isocyanate index is 70 or more, it is possible to prevent poor stirring of the foaming stock solution. When the isocyanate index is 120 or less, it is possible to prevent collapse of the foam.

As a specific example of TDI, the same TDI that can be used for the main second pressure receiving portion 1b is an exemplary example. In the foaming stock solution, one type of TDI may be contained or two or more types of TDI may be contained.

In the foaming stock solution, as an optional component, a small amount of a known polyisocyanate other than TDI may be added in addition to TDI in the above (viii). For example, diphenylmethane diisocyanate (MDI), triphenyl diisocyanate, xylene diisocyanate, polymethylene polyphenylene polyisocyanate, hexamethylene diisocyanate, and isophorone diisocyanate are exemplary examples.

When MDI is contained in the foaming stock solution together with TDI, a total isocyanate index derived from TDI and MDI contained in the foaming stock solution is preferably 70 to 120. When the isocyanate index is 70 or more, it is possible to prevent poor stirring of the foaming stock solution. When the isocyanate index is 120 or less, it is possible to prevent collapse of the foam.

In order to reduce the weight of the seat pad 10, the polyisocyanate contained in the side component 2 preferably contains TDI as a main component. When TDI is contained as a main component, it is possible to easily reduce the weight of the flexible polyurethane foam.

Similarly to the foaming stock solution that forms the main first pressure receiving portion 1a, the foaming stock solution that forms the side component 2 preferably contains a blowing agent, a catalyst, and a foam stabilizer. In addition, the crosslinking agent and other optional components may be contained.

A method of preparing the foaming stock solution that forms the side component 2 and a foam molding method can be performed in the same manner as in the foaming stock solution that forms the main first pressure receiving portion 1a.

When the "foam density" of the side component 2 is measured by the following method, the value (unit: kg/m$^3$) is preferably 40 to 70, more preferably 45 to 65, and most preferably 50 to 60.

When the foam density is within the above range, the balance of physical property values when the main component 1 and the side component 2 are combined becomes favorable and favorable seating stability is obtained.

The level of the foam density can be adjusted by, for example, an amount of blowing agent contained in the foaming stock solution. When the amount of blowing agent increases, the foam density tends to decrease.

When the "foam hardness" of the side component 2 is measured by the following method, the value (unit: kgf/314 cm2) is preferably 25 to 45, more preferably 28 to 40, and most preferably 31 to 35.

When the foam hardness is within the above range, the balance of physical property values when the main component 1 and the side component 2 are combined becomes favorable and favorable seating stability is obtained.

The level of the foam hardness can be adjusted by, for example, an isocyanate index of the foaming stock solution. When the isocyanate index increases, the foam hardness tends to increase.

Preferably, the side component 2 is harder with a higher foam hardness than the main first pressure receiving portion 1a and the main second pressure receiving portion 1b. According to such a relationship, the seating stability is further improved.

<Method of Producing Seat Pad>

As a method of producing a seat pad according to the present invention, a known method can be used except that the foaming stock solution with the above composition is used. For example, a method in which the cushion pad 10A and the back pad 10B are separately produced and are then combined can be used. A main component and side components of the seat pad according to the present invention may be foam-molded integrally or foam-molded separately. In addition, the main first pressure receiving portion and the main second pressure receiving portion may be foam-molded integrally or foam-molded separately. Members that are separately foam-molded are connected by a known method using an adhesive, a bolt, a seat covering material, a seat base, or the like.

<Method of Measuring Physical Properties>

Using test pieces (400 mm in length×400 mm in width× 100 mm in thickness) having the same composition as portions of seat pads of examples, the foam density (unit: $kg/m^3$) was measured according to Japanese Industrial Standards JIS K6400-1. Using the above test pieces, the foam hardness (unit: $kgf/314\ cm^2$) was measured according to Japanese Industrial Standards JIS K 6400-2 (D method).

<Method of Evaluating Ride Comfort>

A monitor sat on seat pads of examples, and evaluated the feeling of shakiness (seating stability) when the upper body was tilted to the left and right in 9 levels. A higher evaluation value indicates less of a feeling of shakiness (higher seating stability) and more excellent ride comfort.

<Method of Evaluating Operability>

A monitor sat on seat pads of examples, and evaluated comprehensive seating comfort such as a feeling of pressure, a hold feeling, and easiness of operation received from the main first pressure receiving portion and the main second pressure receiving portion when a driving operation of an automobile was performed in 9 levels. A higher evaluation value indicates more excellent operability during running.

<Method of Evaluating Reduction in Weight of Foam>

The weights per unit volume of all of the seat pads of the examples were measured and compared. The weight was evaluated in 4 levels with the weight of the seat pad in Comparative Example 1 set as a reference (evaluation value 1), the level was set as "2" when only the side component was reduced in weight, the level was set as "3" when the side component and any one of the first pressure receiving portion and the second pressure receiving portion of the main component was reduced in weight, and the level was set as "4" when all portions (the side component, and the first pressure receiving portion and the second pressure receiving portion of the main component) were reduced in weight. A higher evaluation value indicates a greater reduction in weight.

Based on the above results, it can be clearly understood that the seat pads of Examples 1 to 6 according to the present invention were more reduced in weight than that of Comparative Example 1, and had ride comfort and operability that were improved to the levels of Comparative Example 1 or greater.

When comparing Examples 1 to 6, the operability of Examples 2 to 6 was further improved. The reason for this is inferred to be that the second pressure receiving portion of the main component had the same hardness as the first pressure receiving portion in Example 1, and on the other hand, the hardness of the second pressure receiving portion of the main component was lower (less) than the hardness of the first pressure receiving portion in Examples 2 to 6.

In Comparative Example 1, MDI was used for the side component, and the first pressure receiving portion of the main component had the same foam density as the side component. Comparative Example 1 was the heaviest among all of the seat pads produced in the examples.

In Comparative Example 2, TM20 was used for both the first pressure receiving portion of the main component and the side component, and the first pressure receiving portion of the main component had the same foam density as the side component.

Reduction in weight was improved by 3 points, but the ride comfort and operability deteriorated.

In Comparative Example 3. TM20 was used for the first pressure receiving portion of the main component, and MDI was used for the side component. The weight was reduced by 1 point, but the ride comfort and operability deteriorated.

While the same polyether polyols A1, A2, and A3 were used in the above examples, the present invention is not limited thereto and different polyether polyols A1. A2, and A3 can be used.

Components, combinations, and the like in the embodiments described above are only examples, and additions, omissions, substitutions, and other modifications of the components can be made without departing from the scope of the present invention.

INDUSTRIAL APPLICABILITY

According to the present invention, it is possible to provide a seat pad having both a reduced weight and ride comfort.

REFERENCE SIGNS LIST

1 Main component
1a Main first pressure receiving portion
1b Main second pressure receiving portion
2 Side component
10 Seat pad
10A Cushion pad
10B Back pad

What is claimed is:

1. A seat pad comprising:
a main component having a seating surface; and
side components that are disposed on both sides of the main component,
wherein the main component includes a main first pressure receiving portion and a main second pressure receiving portion that are provided side by side,
wherein the side components are provided in a direction in which the main first pressure receiving portion and the main second pressure receiving portion are arranged and on both sides of the main first pressure receiving portion and the main second pressure receiving portion,
wherein the main first pressure receiving portion and the main second pressure receiving portion are a flexible polyurethane foam obtained by foam molding a foaming stock solution containing a polyol, a polyisocyanate, a blowing agent, and a catalyst,
wherein the foaming stock solution that forms the main first pressure receiving portion contains a polyether polyol A1 having a weight average molecular weight of 3000 to 8000 and 3 to 4 functional groups, and diphenylmethane diisocyanate,
wherein each of the side components is a flexible polyurethane foam obtained by foam molding a foaming stock solution containing a polyol, a polyisocyanate, a blowing agent, and a catalyst,
wherein the foaming stock solution that forms each of the side components contains a polyether polyol A2 having a weight average molecular weight of 3000 to 8000 and 3 to 4 functional groups, and tolylene diisocyanate, and
wherein a foam density of the main first pressure receiving portion is higher than a foam density of each of the side components.

2. The seat pad according to claim 1,
wherein the main first pressure receiving portion is an under-buttock portion during seating and the main second pressure receiving portion is an under-thigh portion during seating.

3. The seat pad according to claim 1,
wherein a foam hardness of the main second pressure receiving portion is lower than a foam hardness of the main first pressure receiving portion.

4. The seat pad according to claim 3,
wherein the main first pressure receiving portion is an under-buttock portion during seating and the main second pressure receiving portion is an under-thigh portion during seating.

5. The seat pad according to claim 1,
wherein the foaming stock solution that forms the main second pressure receiving portion contains a polyether polyol A3 having a weight average molecular weight of 3000 to 8000 and 3 to 4 functional groups, and diphenylmethane diisocyanate.

6. The seat pad according to claim 5,
wherein the main first pressure receiving portion is an under-buttock portion during seating and the main second pressure receiving portion is an under-thigh portion during seating.

7. The seat pad according to claim 5,
wherein a foam hardness of the main second pressure receiving portion is lower than a foam hardness of the main first pressure receiving portion.

8. The seat pad according to claim 7,
wherein the main first pressure receiving portion is an under-buttock portion during seating and the main second pressure receiving portion is an under-thigh portion during seating.

* * * * *